Figure 1:
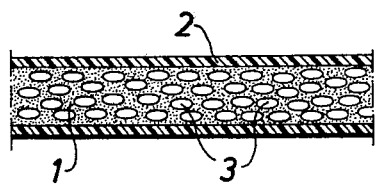

United States Patent [19]

Rausing

[11] 4,126,238

[45] Nov. 21, 1978

[54] PACKING CONTAINER

[75] Inventor: Hans A. Rausing, Lund, Sweden

[73] Assignee: Tetra Pak Developpement SA, Lausanne, Switzerland

[21] Appl. No.: 762,136

[22] Filed: Jan. 24, 1977

[30] Foreign Application Priority Data

Feb. 9, 1976 [CH] Switzerland .................... 1558/76

[51] Int. Cl.² .............................................. B65D 23/00
[52] U.S. Cl. .................................. 215/1 C; 264/230; 264/45.5
[58] Field of Search ................ 215/1; 264/45.5, 45.9, 264/46.1, 230, DIG. 14, DIG. 71

[56] References Cited

U.S. PATENT DOCUMENTS

| 4,007,246 | 2/1977 | Bailey | 264/255 |
| 4,014,724 | 3/1977 | Rausing | 215/1 C |
| 4,039,362 | 8/1977 | Ernstsson | 215/1 C |

FOREIGN PATENT DOCUMENTS 2,559,155  12/1975  Fed. Rep. of Germany .......... 215/1 C

*Primary Examiner*—Ro E. Hart
*Attorney, Agent, or Firm*—Burns, Doane, Swecker & Mathis

[57] ABSTRACT

The invention relates to packing containers formed from shrinkable plastics material of the type in which a plastics blank is shrunk onto a mold to produce a form having a bottleneck shape. The portion so given bottleneck shape has longitudinal and relatively parallel surface pleats. The plastics material so used has a relatively thick base layer of shrinkable foamed plastics material and an outer layer of homogeneous, relatively non-shrinkable plastics material.

6 Claims, 6 Drawing Figures

PACKING CONTAINER

The present invention relates to a packing container manufactured from a shrinkable plastic material and comprising an end portion in the shape of a bottleneck of a substantially smaller cross-sectional area than the remainder of the packing container, the said container being of the type which is given the desired shape by forming a blank of plastic laminate to a cylinder of arbitrary cross-section, whereupon at least parts of the said cylinder are induced with the help of heat to shrink to the said bottleneck shape.

In the technology of packing, glass bottles are often substituted by the corresponding containers made of plastic material. Naturally, these containers do not have to be given the traditional bottle shape, but it has been found that for certain products, such as e.g. wine and beer, the traditional bottle shape on the one hand is practical, and on the other hand is so customary among the consumers, that for the said products bottlelike containers are preferred instead of e.g. parallelepipedic containers. For both beer and wine and for a series of other liquid products, glass bottles have been replaced by blown plastic bottles of in particular polyvinyl chloride, an in many cases the traditional bottle shape has been retained to such an extent that in principle only the glass material has been exchanged for plastic material, which brings about the advantage that the bottles are not breakable in the same way as glass bottles.

Glass bottles containing beer and wine are often provided with a cap and with a seal covering the bottleneck, which in most cases consists of metal foil which by folding can be made to adhere closely to the cap and to the bottleneck. It is the object of these metal foil seals to protect the cap and the pouring opening against contamination, to constitute evidence that the bottle has not been opened and not least to enhance the appearance of the package, and these metal foil seals are therefore often coloured so that they present a gold or silver lustre.

It is of course also possible to provide plastic bottles with the abovementioned metal seals, but since these seals are manufactured from a relatively expensive material, and because the application of the seals is relatively expensive, it has been considered that metal foil seals can be used only for certain special, expensive luxury products, such as export beer and quality wines. It is possible, however, to provide in a simple manner plastic bottles with a pleating reminiscent of the said metal seals, provided the plastic bottles are of the type which is manufactured by shrinkage forming, and these plastic bottles are characterized in that the portion in the shape of a bottle neck has longitudinal, substantially parallel surface pleats which have been formed during the shrinkage forming of the container, and in that the plastic laminate from which the container is manufactured comprises a relatively thick base layer of shrinkable foamed plastic material and at least one outer layer of a homogeneous plastic material which during the shrinkage deformation of the laminate does not shrink, or which experiences a shrinkage only to a substantially smaller degree than the base layer, the said homogeneous plastic layer being attached to the base layer with such good adhesion that no delamination will occur during the shrinkage of the base layer, and that the homogeneous plastic layer is so thin and flexible that it does not to any appreciable extent counteract the shrinkage deformation of the base layer.

Figure 2:
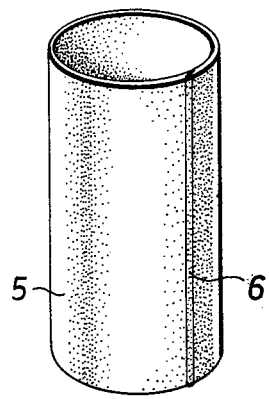
Figure 3:
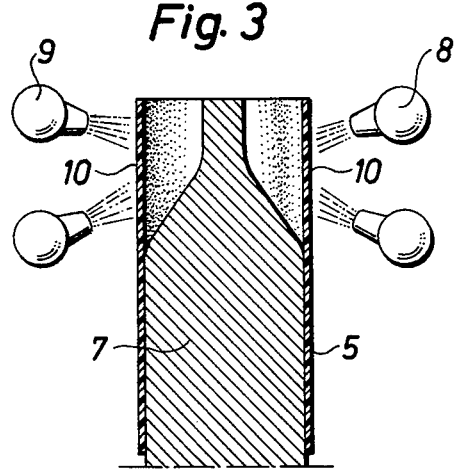
Figure 4:
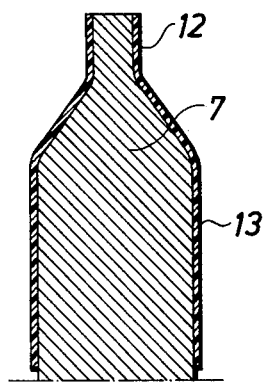
Figure 5:
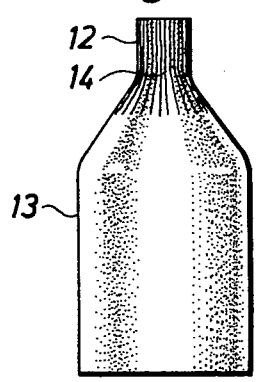
Figure 6:
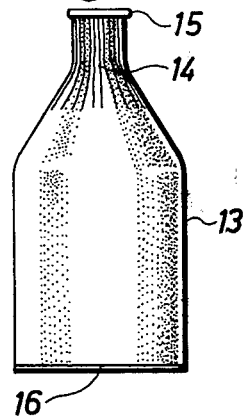

In the following the invention will be described with reference to the enclosed schematic drawing, wherein FIG. 1 shows a strongly enlarged cross-section through a laminate material of the type which is used for the manufacture of packing containers in accordance with the invention, FIG. 2 shows a blank of the packing laminate which has been folded to a cylinder, FIG. 3 shows how the cylinder illustrated in FIG. 2 is shrinkage formed onto a mandrel, FIG. 4 shows a cross-section of the shrinkage formed container body placed on the mandrel, FIG. 5 shows the ready-formed container body, and FIG. 6 shows a finished, bottlelike container in accordance with the invention.

As mentioned in the introduction, packing containers are manufactured in accordance with the invention by shrinkage forming of a shrinkable packing laminate of the type which is shown in a strongly enlarged cross-section of FIG. 1. The packing laminate comprises a base layer 1 of an extruded plastic foam, preferably polystyrene foam, whereby the plastic foam material, directly after the extruding operation, is subjected to stretching which brings about a reduction of thickness of the material but also an extension of the closed cells 3 of the material, which in the manner as shown in FIG. 1 are given a lenticular or elongated form. The stretching can take place either in one direction or in two directions perpendicular to one another, and if the stretching takes place only in one direction the material will be shrinkable only in that direction, since the shrinkage characteristic is based on the fact that the cells which have been extended during the stretching will endeavour on renewed heating of the material to re-assume spherical shape. The laminate material shown in FIG. 1 also has an outer homogeneous plastic covering 2 which may consist of polystyrene, acrylic material, polyvinylidene chloride or acrylonitrile compounds of the type marketed under the trade name BAREX. The laminate may also be provided with an inside coating of a homogeneous plastic material of the same type as the homogeneous plastic layer 2.

It is important, however, that at least the outer plastic layer 2 should have good mechanical adhesion to the base layer 1 so that no delamination occurs between the plastic layer 2 and the base layer 1 when the laminate material is subjected to shrinkage deformation in connection with the heating of the laminate to such an extent that the foamed plastic material is made to soften and the cells in the base layer revert to their spherical shape. Moreover, the outer plastic layers 2 and 4 must not be so thick or so rigid mechanically as to counteract appreciably or prevent the shrinkage of the foamed plastic material. As a general rule it can be said that the outer plastic layers 2 and 4 shall have a thickness which is less than 10% of the thickness of the base layer, and preferably have a thickness of only approx. 5% of the thickness of the base layer.

The blanks for packing containers in accordance with the invention are manufactured from a laminate of the type which has been described above and the plane cut-out blanks of this laminate are first formed to a cylinder in the manner as shown in FIG. 2. In FIG. 2 is shown how the package blank is given the shape of a circular-cylindrical cylinder 5 by joining together the edge zones of the blanks in a longitudinal joint 6. The cylinder need not necessarily have a circular cross-section, but in principle any cross-section would be conceivable.

The cylinder formed is further processed in that it is threaded onto a mandrel 7, as shown in FIG. 3, whose shape corresponds to the inner contour of the desired packing container. As can be seen from the figure, a part of the previously formed cylinder will adhere to the walls of the mandrel whilst other parts 10 of the cylinder are not in contact with the mandrel when the cylinder 5 is threaded onto the mandrel 7. When the cylinder 5 has been placed onto the mandrel 7, at least the parts 10 of the cylinder 5 which do not adhere to the surface of the mandrel 7 are heated with the help of infrared radiation elements 9 and/or hot air which is blown against the parts 10 of the cylinder 5 with the help of blowing nozzles 8. When the parts 10 of the cylinder 5 have been heated to such an extent that the foamed plastic material in the base layer 1 has softened, the base layer 1 is caused to shrink, when, as can be seen in FIG. 4, the parts 10 of the cylinder 5 are induced to adhere to the shaped part 11 of the mandrel 7, so that the cylinder is shrunk to a bottleneck 12 whose cross-section is substantially smaller than the cross-section of the non-shrunk parts 13 of the cylinder.

After the shrinkage operation the container body formed is removed from the mandrel 7, and, as can be seen from FIG. 5, the shrinkage formed container body has a multitude of surface pleats 14 along the shrunk part 12 in the shape of a bottleneck, whilst the remaining parts 13 of the container body do not have such surface pleats.

The reason for the formation of the said surface pleats 14 is that the homogeneous plastic layer 2 in the packing laminate does not shrink, or shrinks to a lesser degree than the base layer 1, when the part 10 of the cylinder is heated. Owing to the homogeneous plastic layer 2 being relatively thin and flexible, the same is made to follow the base layer 1 during the shrinking of the latter, but since the surface layer 2 itself does not shrink to the same extent as the base layer 1, a multitude of mutually parallel surface pleats 14 are formed along the surface of the homogeneous plastic layer 2, the preferred direction of which coincides with the axial direction of the cylinder. These surface pleats 14, which are shown in FIG. 5, resemble in an astounding manner the metal foil seals described in the introduction which are used in connection with glass bottles, among other things with the object of enhancing the appearance. For a further enhancement of the appearance of the bottle body formed, and for the imitation of the said metal foil seals, it is appropriate to metallize the part 12 of the packing container in the shape of a bottleneck presenting surface pleats 14. This metallization may be carried out before the shrinkage operation, but may also be carried out after the shrinkage has been accomplished, and the metallization may be done with the help of so-called vacuum metallization or in that the bottleneck part 12 is sprayed or dipped in conventional manner in metallic lustre paint. After this treatment, the packing container is finished, and the finished packing container is shown in FIG. 6. The bottlelike packing container shown in FIG. 6 has been provided with a base 16 which may be realized in optional manner, but which is appropriately realized so that a disc of plastic material is sealed to the bottom edge of the container body 13. After filling, the packing container is provided with a cap of optional type, whereupon the packing container is ready to be distributed.

It has been found that packing containers in accordance with the invention obtain an appearance which surpasses corresponding bottlelike containers which have been manufactured by blowing of a plastic tube, and it has also been found that the surface pleats 14 formed on the part of the packing container shaped like a bottleneck have a reinforcing effect on the bottleneck portion, and that the pleated portion moreover acts to some extent as a drip catcher.

The shrinkage forming process shown in FIGS. 3 and 4 is only intended to illustrate the principle of shrinkage forming and it has been found that shrinkage forming can be carried out without applying an inner mandrel as shown in the embodiment. The choice of heating sources for the realization of the shrinkage depends upon the characteristics of the packing material and upon the mechanical equipment that is available, and it is thus possible to modify within wide limits the choice of heat sources as well as their placing.

The said plastic material which is intended to form the outer homogeneous plastic layer has proved particularly suitable for being applied in connection with packing containers in accordance with the invention, but it is also possible to use other thermoplastic material in the homogeneous surface layer, and preferably such material that has greater toughness than the plastic foam.

I claim:

1. A bottle shaped container having a cylindrical body portion and a bottleneck portion comprising: an integral plastic wall having a base layer of a heat shrinkable foam plastic material and an outer layer of a substantially non-heat shrinkable homogeneous plastic material secured to the base layer and having a thickness of not more than about 10% of the thickness of the base layer, said bottleneck portion having substantially parallel surface pleats formed on the outside thereof by heat shrinking one end of a cylinder of the base layer to cause the base layer at said one end to shrink to form the bottleneck portion while causing the substantially non-heat shrinkable outer layer to form pleats about the outside of the bottleneck portion.

2. A packing container as claimed in claim 1 and further comprising a second layer of substantially non-heat shrinkable homogeneous plastic material secured to the opposed side of said base layer.

3. A packing container as claimed in claim 1, wherein the thickness of the outer layer of homogenous plastic material is not more than 5% of the thickness of the base layer.

4. A packing container as claimed in claim 1, wherein the base layer of the laminate is formed of extruded polystyrene foam which has been stretched.

5. A packing container as claimed in claim 1, wherein the outer layer of homogenous plastic material is selected from the group consisting of polystyrene and acrylic materials.

6. A packing container as claimed in claim 1 and further comprising a metallic coating on the outer layer of the bottleneck portion for providing the pleats formed thereabout with a metallic lustre.

* * * * *